US008696466B2

(12) United States Patent
Buhr

(10) Patent No.: US 8,696,466 B2
(45) Date of Patent: Apr. 15, 2014

(54) METHOD AND APPARATUS FOR IMPLEMENTING NEMESIS MATCHMAKING

(75) Inventor: Brian Douglas Buhr, San Diego, CA (US)

(73) Assignee: Sony Computer Entertainment America LLC, San Mateo, CA (US)

(*) Notice: Subject to any disclaimer, the term of this patent is extended or adjusted under 35 U.S.C. 154(b) by 385 days.

(21) Appl. No.: 13/115,875

(22) Filed: May 25, 2011

(65) Prior Publication Data
US 2012/0302332 A1 Nov. 29, 2012

(51) Int. Cl.
*A63F 9/24* (2006.01)
*A63F 13/12* (2006.01)

(52) U.S. Cl.
CPC ........... *A63F 13/12* (2013.01); *A63F 2300/556* (2013.01); *A63F 2300/5566* (2013.01); *A63F 2300/558* (2013.01)
USPC .............................................. 463/42; 463/29

(58) Field of Classification Search
CPC ......... A63F 13/00; A63F 13/10; A63F 13/12; A63F 2300/556; A63F 2300/5566; A63F 2300/558
USPC ...................................................... 463/42, 29
See application file for complete search history.

(56) References Cited

U.S. PATENT DOCUMENTS

| 8,267,760 | B2* | 9/2012 | Iwakiri et al. ..................... 463/1 |
| 2004/0143852 | A1* | 7/2004 | Meyers ......................... 725/133 |
| 2005/0101386 | A1* | 5/2005 | Lavanchy et al. ............... 463/42 |
| 2005/0282635 | A1* | 12/2005 | Aoki ............................... 463/42 |
| 2006/0287106 | A1* | 12/2006 | Jensen ............................. 463/42 |
| 2007/0218997 | A1* | 9/2007 | Cho ................................ 463/42 |
| 2009/0209334 | A1* | 8/2009 | Umaki et al. ................... 463/29 |
| 2009/0254859 | A1* | 10/2009 | Arrasvuori et al. ........... 715/810 |
| 2010/0173708 | A1* | 7/2010 | Yamakawa ..................... 463/35 |
| 2011/0022450 | A1* | 1/2011 | Meredith ..................... 705/14.4 |
| 2011/0034249 | A1* | 2/2011 | Iwakiri et al. .................. 463/36 |
| 2011/0143840 | A1* | 6/2011 | Sotoike et al. ................. 463/42 |

* cited by examiner

*Primary Examiner* — Michael Cuff
(74) *Attorney, Agent, or Firm* — Fitch, Even, Tabin & Flannery LLP

(57) ABSTRACT

A method is provided for matchmaking including receiving at a processor based system a request from a user to join a game having one or more matches, wherein the matches comprise a first side playing against a second side wherein each of the first side and second side comprises a set of one or more players, obtaining a nemesis list for the user wherein the nemesis list comprises a list of one or more players having a determined rivalry against the user, and assigning the user to at least one match on one of the first side and the second side at least in part based on the nemesis list. A computer readable storage medium stores one or more computer readable programs adapted to cause a processor based system to execute similar steps, and a processor-based system is configured to perform similar steps.

27 Claims, 13 Drawing Sheets

METHOD AND APPARATUS FOR IMPLEMENTING NEMESIS MATCHMAKING

BACKGROUND OF THE INVENTION

1. Field of the Invention

The present invention relates generally to computer games, video games, and/or gaming, and more specifically to matching players with other players and/or teams in such games.

2. Discussion of the Related Art

Computer games, such as video games, have become a popular source of entertainment. Computer games are typically implemented in computer game software applications and are often run on game consoles and entertainment systems. With the development of internet communications, players of computer games are able to play in communities, such as clans or guilds, teams, etc. In such games players remote from one another communicate over the internet or game application and form teams or other communities to play games together.

SUMMARY OF THE INVENTION

In one embodiment, the invention can be characterized as a computer readable storage medium storing one or more computer readable programs adapted to cause a processor based system to execute steps comprising: receiving a request from a user to join a game having one or more matches, wherein the matches comprise a first side playing against a second side wherein each of the first side and second side comprises a set of one or more players; obtaining a nemesis list for the user wherein the nemesis list comprises a list of one or more players having a determined rivalry against the user; and assigning the user to at least one match on one of the first side and the second side at least in part based on the nemesis list.

In another embodiment, the invention can be characterized as a processor-based system comprising: one or more processor-based machines; the processor-based system configured to perform steps comprising: receiving a request from a user to join a game having one or more matches, wherein the matches comprise a first side playing against a second side wherein each of the first side and second side comprises a set of one or more players; obtaining a nemesis list for the user wherein the nemesis list comprises a list of one or more players having a determined rivalry against the user; and assigning the user to at least one match on one of the first side and the second side at least in part based on the nemesis list.

In yet another embodiment, the invention can be characterized as a method comprising: receiving at a processor based system a request from a user to join a game having one or more matches, wherein the matches comprise a first side playing against a second side wherein each of the first side and second side comprises a set of one or more players; obtaining a nemesis list for the user wherein the nemesis list comprises a list of one or more players having a determined rivalry against the user; and assigning the user to at least one match on one of the first side and the second side at least in part based on the nemesis list.

In a further embodiment, the invention can be characterized as a computer readable storage medium storing one or more computer readable programs adapted to cause a processor based system to execute steps comprising: receiving a request from a user to achieve an objective in a game having one or more matches, wherein the matches comprise a first side playing against a second side, and wherein each of the first side and second side comprises a set of one or more players, wherein the objective is achieved by the user playing against one or more other players; obtaining a list of the one or more other players necessary for achieving the objective; and assigning the user to at least one match on one of the first side and the second part such that the user is able to play against the one or more other players necessary for achieving the objective.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
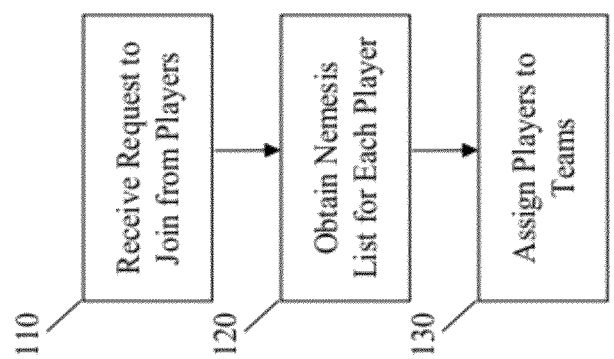
FIG. 1 is a flow diagram illustrating a method of nemesis matchmaking, according to several embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

In computer games, such as in online games, the process of matching players with other players and/or teams is generally referred to as matchmaking Previous systems generally allow matchmaking but are limited to matchmaking with teammates or friends who intend to join as a party or group to play a game together. In most cases, these systems only address cooperative play. Developers of these previous systems assume that online game play is about grouping up with other players. In such systems matchmaking services are available to enable joining players to play on the same team or side in a game. However, an important aspect of game play is driven by ego, statistics, accomplishments, and previous systems fail to apply these aspects of game play to matchmaking To be the best, players want to beat their friends, to beat the top leader board players, etc. Players enjoy the ability to establish rivalries. In clan-based games, clans want a way to distinguish members.

In some embodiments, the present invention provides a matchmaking system allowing players to group up and get matched into the same game, but with the intent to stage players on opposing/different teams. In one or more embodiments, the system supports the ability to challenge another player with whom a player wants to contest with, so the players can settle who is best in games where they oppose each other. In addition, in one or more embodiments, the system further supports statistics tracking for nemesis-based competition. Throughout this specification exemplary embodiments are provided describing the invention with regard to a game, online game, etc. However, it should be understood that the present methods may be used in any party based environment or gaming environment to provide for a nemesis based party system.

The unique methods of matchmaking described herein improves replayability in online games by recognizing that players should be able to group up together, but with the intent to play against each other. This feature opens new opportunities for statistics and leader boards, making smaller communities wherein players can have additional chances to succeed, thus making the game more fun and increasing the player's sense of belonging in a community. Tournaments can now be seeded in a weighted fashion—automatically. Entrants' nemesis lists can be taken into account to give them a better chance of surviving through the tournament longer so that they don't knock each other off in the early rounds. In clan based games, pitting members' success against each other via nemesis matchmaking provides a new, unique way to automate clan officer levels.

Thus, in some embodiments the present system provides for nemesis matchmaking Nemesis matchmaking addresses competitive play. In some embodiments, the present system provides numerous features including, allowing players to compete with friends and clan mates within the same games and/or challenge enemies or nemeses into games, and track statistics and rankings of game play against a player's nemeses. In one or more embodiments, the system may further combine nemesis matchmaking with party-based matchmaking to enable placement of two groups in opposition of each other within the same game. In some embodiments, the system will establish groups of players with whom a player intends to compete against, detect when they are online, and challenge them via nemesis matchmaking In clan-based game play, the present system may employ nemesis matchmaking to determine clan officer levels based on nemesis competition between clan members, so that the better players are automatically promoted. Additionally, a player may compete against leading players by requesting matchmaking against them if they are online. Furthermore, the nemesis matchmaking allows the system to prevent a player from competing against players with whom that player typically struggles.

In some embodiments, where a game involves tournaments, the present system allows the application of nemesis matchmaking to tournament signups. Such embodiments may be used so that better players are automatically seeded away from each other to increase probability of the players coming head to head later in the tournament. Or, such embodiments may be used to avoid matching players together who simply want a greater chance of facing each other in later rounds, by emphasizing opposite groupings in the initial rounds.

In one or more embodiments, by maintaining local lists of nemesis players, i.e. each players nemesis list, the system allows the game client to communicate the list to game servers (whether client-server or peer-to-peer network architecture) so that if any of the other players already are in the game being joined, the joining player will be matched opposite his nemesis. Alternately, server storage can maintain the lists, and independent matchmaking services (rather than game-server integrated) can apply nemesis matchmaking rules to allow players to group up and enter a desired game together, to then be split apart on opposite sides. Alternately, tournament systems can apply the nemesis list in nemesis matchmaking as a basis for seeding the players and placing the players into the tournament.

In one or more embodiments, in addition to maintaining nemesis lists for players, the system may further support creating statistics for game play against nemesis including information such as, wins and losses, a player's strongest nemesis, i.e. players that the player struggles with/is defeated against most, the player's best rival, i.e. players who the player is most close with in term of different characteristics and/or wins and losses, a player's weakest nemesis, i.e. players the player defeats the most, and/or game custom statistics. In one or more embodiments, by collecting statistics of each player's game activity, the system is able to determine and maintain lists containing such information. In one embodiment, this information is stored along with the nemesis list for each user and may be used during the nemesis matchmaking process. In other embodiments, the list may be stored and maintained separate from the nemesis list.

Referring first to FIG. 1, a flow diagram of a method of nemesis matchmaking is provided. First, in step 110, the system receives a request from one or more players to join a game. Players may request to join as groups or as individuals. In one embodiment, each player who requests to join the game may have a nemesis list. In another embodiment, only a number of the requesting players have nemesis lists. Examples of games where players may be matched against one another includes any game where players play opposite one another, such as, first person shooter games where players are assigned to opposing shooter teams, game show or quiz games where players are matched on different teams or groups, card games such as poker where players are assigned to the same table to play against one another or to different tables during a tournament, sports games where players are assigned to positions on opposing teams, etc.

In step 120, the system obtains the nemesis lists for those players with a nemesis list. For example, in one embodiment, the players who join may communicate their list to the system as they request to join a game. In another embodiment, the system may automatically query a database and retrieve the nemesis list for each of the players who request to join the game. In one or more embodiments, by maintaining local lists of nemesis players, i.e. each players nemesis list, the game client is able to communicate the list to game servers (whether client-server or peer-to-peer network architecture) so that if any of the other players already are in the game being joined, the joining player will be matched opposite his nemesis. Alternately, server storage can maintain the lists, and independent matchmaking services (rather than game-server integrated) can apply nemesis matchmaking rules to allow players to group up and enter a desired game together, to then be split apart on opposite sides. Alternately, tournament systems can apply the nemesis list in nemesis matchmaking as a basis for seeding the players and placing the players into the tournament.

In one embodiment, the nemesis list for each player may be associated with a list of players which have been established as the player's nemesis. In one embodiment, the list may comprise a user generated list, a system generated list, or a combination thereof. That is, in several embodiments, the system may allow the user to add one or more other users to his or her nemesis list. For example, in one embodiment, a user may use a method such as grudge tagging to add players he considers as rivals to his nemesis lists. In another embodiment, a user may be able to select one or more players from his friends list or some other list to be added to the nemesis list.

In other embodiments the system may automatically add users to the player's nemesis list based on different factors. In some embodiments, these factors may be specified by a user, the system and/or the game developers. For example, in one embodiment, such automatic selections may be made based on game statistics collected throughout game play such as player's game performance against other players, e.g. wins, loses, points for, points against, etc., and or other game related data such as the player's overall opinion of the other players, e.g. through comments or tags, etc.

In yet another embodiment, in addition, the user may request a certain result and the system may retrieve a list of players to match against the player to achieve such result. For example, if a user requests to play against top leader board players, the system may automatically determine such players and match these players against the player for game play. In another exemplary embodiment, the player may request to play against other clan members to establish ranks in a clan, and this may also be achieved through nemesis matchmaking In one or more embodiments, such selections or additions may be done either before, during or after game play.

In one embodiment, upon retrieving or obtaining the nemesis list for the player/players requesting to join the game, the system then assigns the player to a game in step 130. In one embodiment, the player may send the request to join a game to a nemesis matchmaker. In such embodiment, the nemesis matchmaker may obtain the nemesis list and may then match the player to a specific game based on the nemesis list. In such embodiment, the nemesis matchmaker may then contact the game server and place the players into the game according to the assignments made by the nemesis matchmaker. In another embodiment, the player may request to join a game and may then be connected to a game server communicating their nemesis list at the time they connect to the game server and the game server may be configured to locally match players to a game based on the obtained nemesis list. In one embodiment, the players may be matched to a game before the game begins. That is, in one embodiment, the matchmaking process may assign players to each side of a game or to matches in a game or tournament before the game begins. In some embodiments, the game may not begin until enough players have joined the game such that a completed match or tournament has been created. In another embodiment, matchmaking may be done as players join the game and/or matchmaking may be completed while the game is in progress.

In one or more embodiments, each player in a game may have a nemesis list and team/match assignments during step 130 may be done based on each player's nemesis list to obtain the most optimized result for all players, i.e. players are placed such that the best overall placement of players is based on the nemesis list for each player. In one embodiment, less than all the players of the game may have a nemesis list, may communicate their nemesis list to the matchmaker or game server, and/or may request/desire to be matched into the game based on their nemesis list. In such embodiments, the team/match placements may be such that the most optimized results are achieved for those players with nemesis lists while other players may be assigned to remaining spots in the game and/or matched based upon other considerations such as preferences, etc. In one embodiment, the game may match the players as they request to join a game, in such embodiment, the match is made based on the players that are already assigned to teams. In one such embodiment, the requesting player's nemesis list may be considered with respect to those players already in the game when adding the player to the game. In an additional or alternative embodiment, the nemesis lists and/or preferences for players already assigned to the teams may be taken into account in assigning the new player to the game. That is, in one embodiment the list for all players already assigned to the game and/or playing the game may be retrieved and considered in step 130 before adding the player to the game. In another embodiment, each time a player requests to join the game, even where the player does not have a nemesis list, nemesis lists for players already within the game may be considered when assigning the new player to the game.

Figure 2:
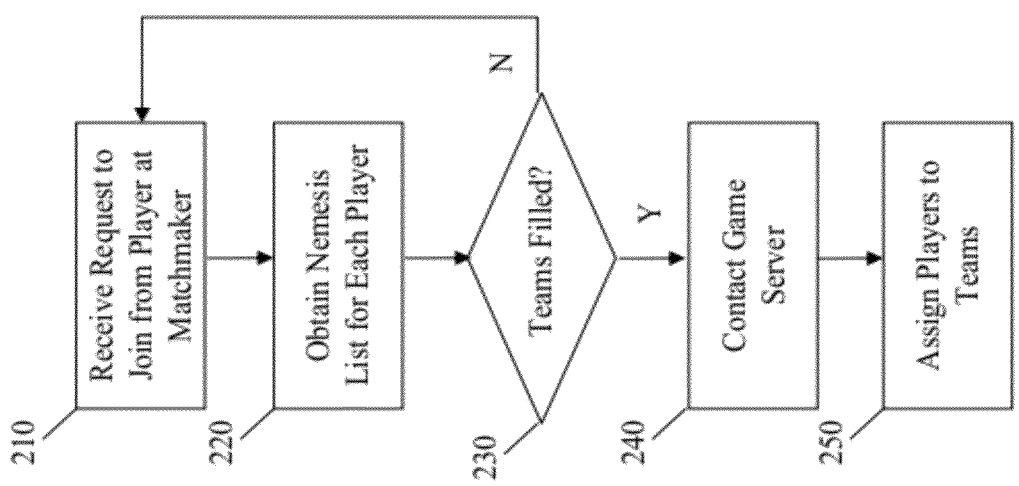
FIG. 2 is a flow diagram of a first method of nemesis matchmaking, according to several embodiments of the present invention.

Referring next to FIG. 2, a flow chart of first method of nemesis matchmaking according to one embodiment of the present invention is illustrated. First, in step 210, requests to join a game are received from one or more players at a nemesis matchmaking service. In one embodiment, users will request to join a game as a group or will join as an individual. In one embodiment, one or more users in each group and/or one or more individual users requesting to join the game may have a nemesis list of users which they wish to play against. In one embodiment, the players directly contact the nemesis matchmaking service. In another embodiment, players may request to join the game and may then be directed of the matchmaking service. For example, in one embodiment the game server or another server may function as a proxy between the player and the nemesis matchmaking service. In such embodiments, the proxy server may receive messages from the player and communicated with the matchmaking service on behalf of the player. The nemesis matchmaking service, in one or more embodiment, may be a standalone service, while in other embodiments the nemesis matchmaking service may be integrated with the game server.

Next, in step 220, the nemesis matchmaking service obtains the nemesis list for one or more of the players requesting to join the game. In one embodiment, the nemesis matchmaking service obtains the nemesis list for each player requesting to join a game. In one embodiment, server storage can maintain the lists, and the nemesis matchmaking service can apply nemesis matchmaking rules to allow players to group up and enter a desired game together, to then be split apart on opposite sides and/or for individual players to enter a game and be assigned to teams. In one embodiment, the list is maintained locally at each player's console.

In one embodiment, the nemesis matchmaking service is configured to contact a database of nemesis list and obtain the list for each player. In another embodiment, each player may communicate their nemesis list to the matchmaking service upon requesting to join a game.

In one embodiment, the nemesis list for each player may be associated with a list of players which have been established as the player's nemesis. In one embodiment, the list may comprise a user generated list, a system generated list, or a combination thereof. That is, in several embodiments, the system may allow the user to add one or more other users to his or her nemesis list. For example, in one embodiment, a user may use a method such as grudge tagging to add players he considers as rivals to his nemesis lists. In another embodiment, a user may be able to select one or more players from his friends list to be added to the nemesis list.

In one embodiment, in addition, the user may request a certain result and the system may retrieve a list of players to match against the player to achieve such result. For example, if a user requests to play against top leader board players, the system may automatically determine such players and match these players against the player for game play. In another exemplary embodiment, the player may request to play against other clan members to establish ranks in a clan, and this may also be achieved through nemesis matchmaking In one or more embodiments, such selections or additions may be done either before, during or after game play.

In other embodiments the system may automatically add users to the player's nemesis list based on different factors. In some embodiments, these factors may be specified by a user, the system and/or the game developers. For example, in one embodiment, such automatic selections may be made based on game statistics collected throughout game play such as player's game performance against other players, e.g. wins, loses, points for, points against, etc., and or other game related data such as the player's overall opinion of the other players, e.g. through comments or tags, etc.

Next, in step 230, the nemesis matchmaking service finds enough players to fill the teams on the game server. In one embodiment, the matchmaking service finds enough players who join as groups and/or individual to create an optimum game based on the nemesis lists obtained for each of the one or more players requesting to join the game. In some embodiments, the nemesis matchmaking service waits to receive requests from players to fill the teams at the game server. If in step 230 it is determined that enough requests have not received the system returns to step 210 and waits to receive more requests and continues to step 220 and obtains the nemesis lists for those users until enough requests have been received. When it is determined in step 230 that enough players have been recruited to fill the teams on the game server, in step 240 the matchmaking service contacts the game server and the players are joined to the game server.

Figure 3:
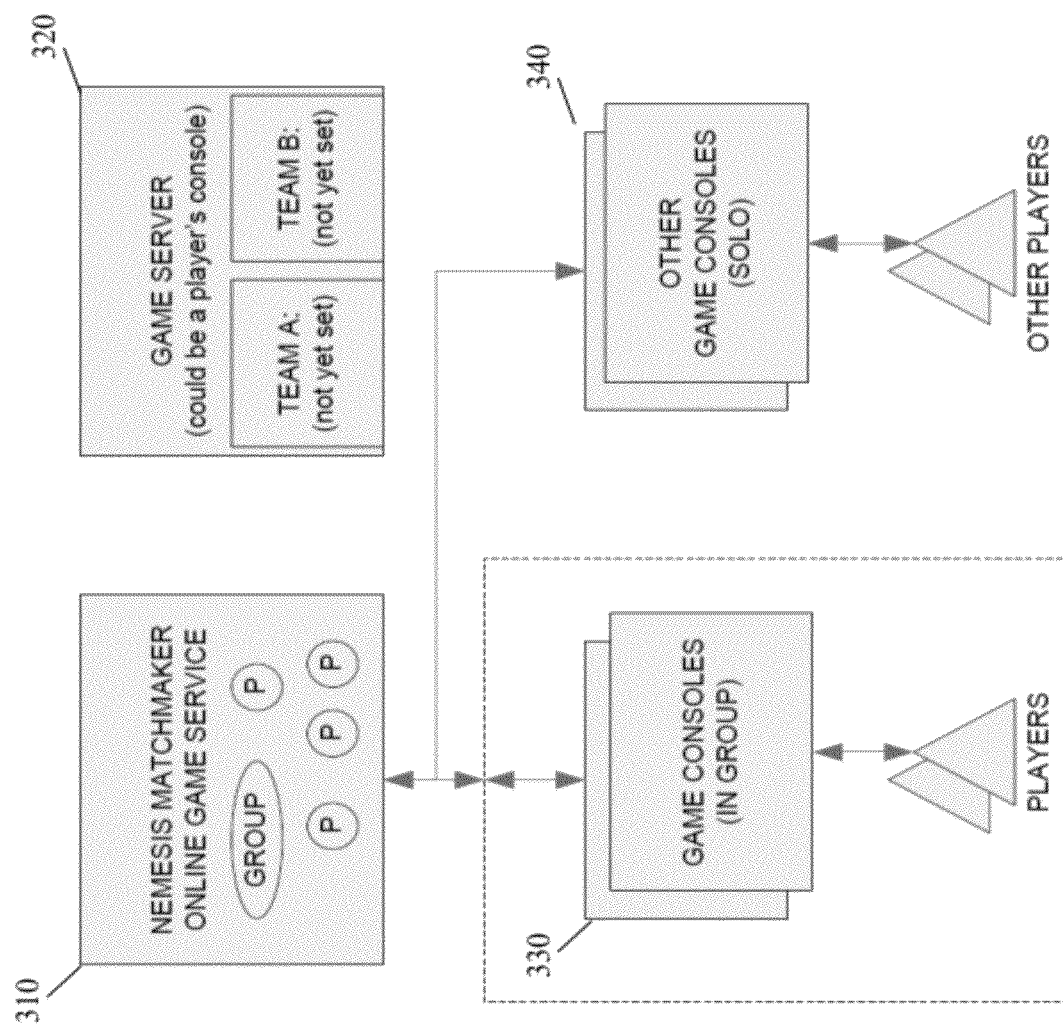
FIG. 3 is a system diagram of an exemplary embodiment of the present invention, according to several embodiments of the present invention.

FIG. 3 illustrates a system diagram of an exemplary embodiment of the present invention during the steps 210-230 described above. As shown in FIG. 3, one or more game consoles 330, i.e., player's consoles which contact the matchmaking service as a group, and 340, i.e., player's consoles which contact the matchmaking service as individuals establish a connection to the nemesis matchmaker online gaming service 310. As discussed above, players may directly communicate with the matchmaking service or may be rerouted to the matchmaking service 310 upon requesting to join a game from a different entity. As shown, at this stage, the game server is not in communication with the players and all communication regarding requests for game play are processed at the nemesis matchmaking service.

Next in step 250, players are assigned to teams on the game server. In one embodiment, players of groups, i.e. game consoles 320 who requested to join the game are first split up amongst the teams. Then, the individual players are assigned to the remaining spots on the teams.

In one embodiment, the assignment is made by the matchmaking service based on the player's nemesis list. In one embodiment, other considerations may further be taken into account such as the player's friend list or preferred list. That is, in addition to a nemesis list, players may further be associated with a preferred list of players which the players wish to play in the same side or team with. In such embodiment, such preferred list may also be taken into account when the matchmaking service assigns players to the teams on the game server.

Once the players are assigned to the teams at the game server the game begins and players are able to play against one another. In one embodiment, such nemesis matchmaking enables competing with friends and clan mates within the same online games or competitions. In one embodiment, the nemesis matchmaking enables challenging enemies or nemeses into games. In additional or alternative embodiments, the nemesis matchmaking capability is combinable with party-based matchmaking to require placement of two groups in opposition of each other within the same game. In one or more embodiment, the nemesis matchmaking method described above enables establishing groups of players with whom a given player intends to compete against, detect when those players, i.e. nemeses, are online, and challenge those players/nemeses via nemesis matchmaking.

In one embodiment, where the game comprises clans, the above method provides an approach to determining clan officer levels based on nemesis competition between clan members, such that, for example, in one embodiment, better players are automatically promoted. For example, the nemesis matchmaking component of the present invention enables a user/player to be set against those with higher ranks or officer levels within a clan such that the player can challenge those players and advance within the clan ranks In another embodiment, the player may achieve leader board ranking by being matched against players with better leader board rankings similar to the clan based embodiment. In yet another embodiment, the nemesis matchmaking component allows for a nemesis filtering or block. For example, in one embodiment, the matchmaking component may prevent a player from competing against players with who the player typically struggles with, or with players the player tags as not wishing to play with.

In one embodiment, when applying nemesis matchmaking to players, the system may employ weights to determine team positioning. That is, in one embodiment, each nemesis may have a weighted nemesis score in relation to other nemeses in a players list and therefore may be given higher priority or importance when the system is applying the nemesis matchmaking method described above. In one or more embodiments, such weights may be based on different criteria such as for example statistics and/or information automatically collected by the system, and/or other indications manually entered by the user, e.g. the number of grudge tags or weights assigned by the user manually to a nemesis within the nemesis list.

Figure 4:
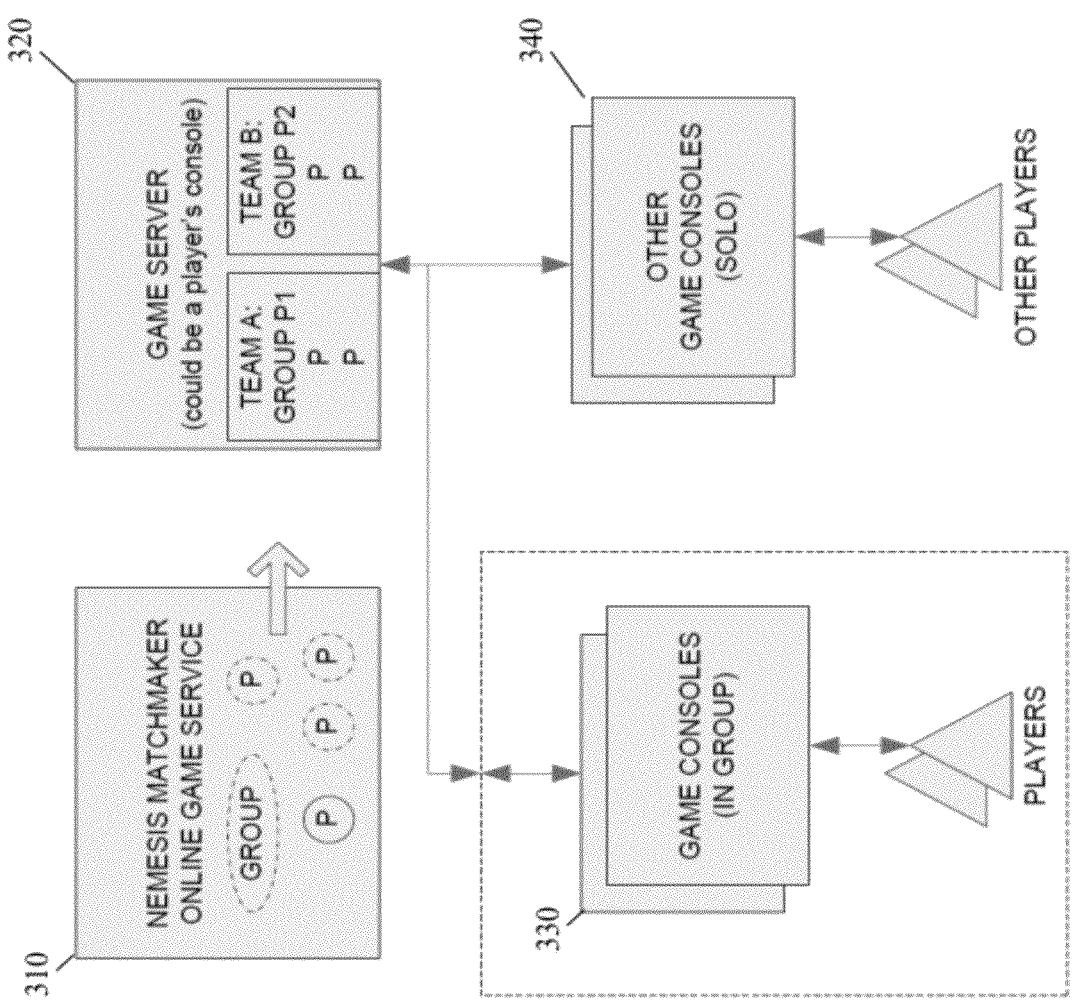
FIG. 4 is a system diagram of an exemplary embodiment of the present invention, according to several embodiments of the present invention.

FIG. 4 illustrates a system diagram of an exemplary embodiment of the present invention during the steps 240 described above. As shown, once the nemesis matchmaking system has determined that enough players have been allocated to fill both teams, the players are joined to the same server and assigned to teams A & B on the game server. As shown, for example, game consoles 330 and 340 are now connected to game server 320 and begin game play according to assignments made by the nemesis matchmaking service 310.

In one or more embodiments, in addition to maintaining nemesis lists for players, the system may further support creating statistics for game play against nemesis including information such as, wins and losses, a player's strongest nemesis, i.e. players that the player struggles with/is defeated against most, the player's best rival, i.e. players who the player is most close with in term of different characteristics and/or wins and losses, a player's weakest nemesis, i.e. players the player defeats the most, and/or game custom statistics. In one or more embodiments, by collecting statistics of each player's game activity, the system is able to determine and maintain lists containing such information. In one embodiment, this information is stored along with the nemesis list for each user and may be used during the nemesis matchmaking process. In other embodiments, the list may be stored and maintained separate from the nemesis list. In one or more embodiments, players are able to access such information and view their nemesis list and statistics.

Figure 5:
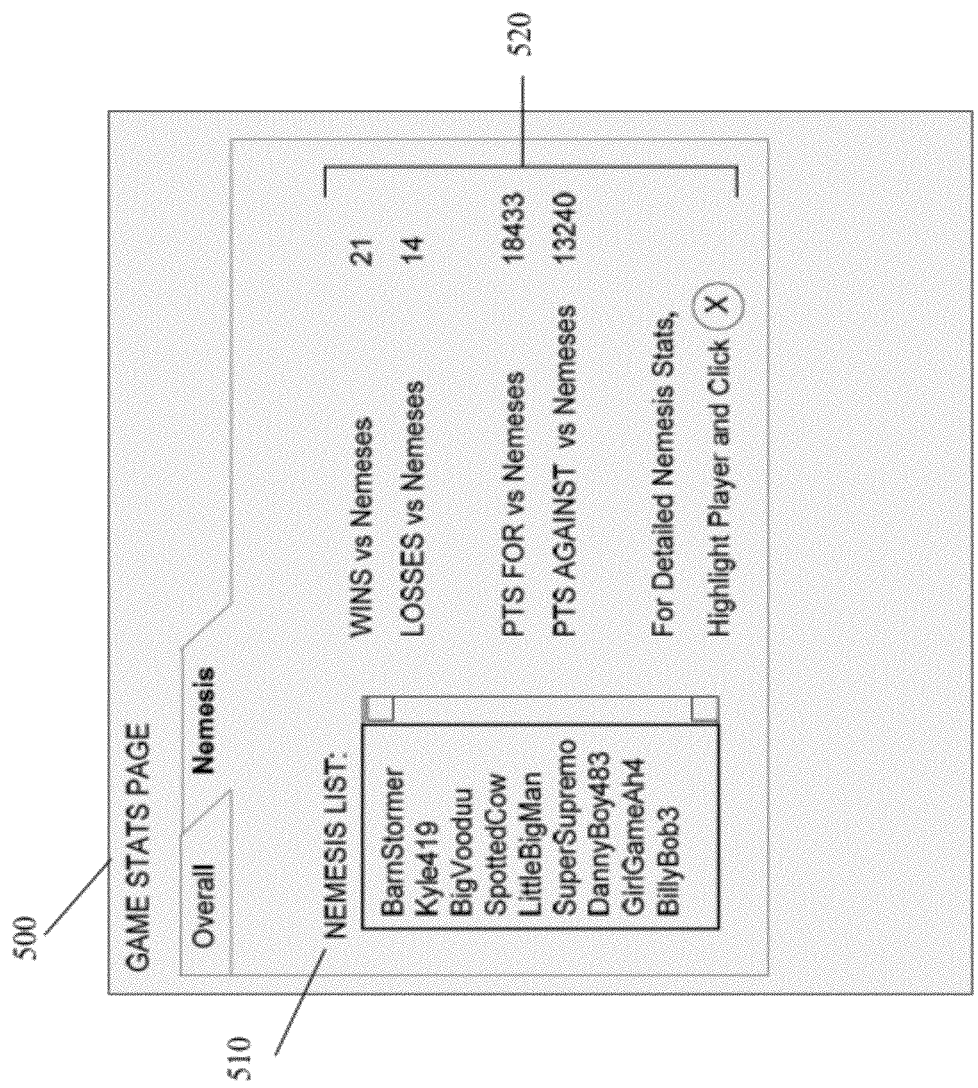
FIG. 5 is an exemplary embodiment of an overall nemeses page that is displayed to the user/player, according to several embodiments of the present invention.

FIG. 5 illustrates an exemplary embodiment of an overall nemeses page 500 that is displayed to the user/player upon requesting to view the nemesis list and/or statistics associated with the player. As shown, the game stat page 500 comprises a nemesis list 510, and a statistics section 520. The nemesis list 510 provides a list of one or more users that have been assigned to the player's nemesis list. As discussed above, these users may be added to the list by the player manually, and/or may be automatically added by the system according to one or more criteria. The statistics section 520 displays system defined statistics such as wins and losses against players on the user's nemesis list and points for and against player's on the user's nemesis list. Other statistics may also be provided on the page. In addition, the game statistics page provides the user with the ability to find specific statistics with respect to each player on the nemesis list by selecting that player. In one embodiment, this option enables the user/player to view their statistics against a specific player that they consider a nemesis or rival.

Figure 6:
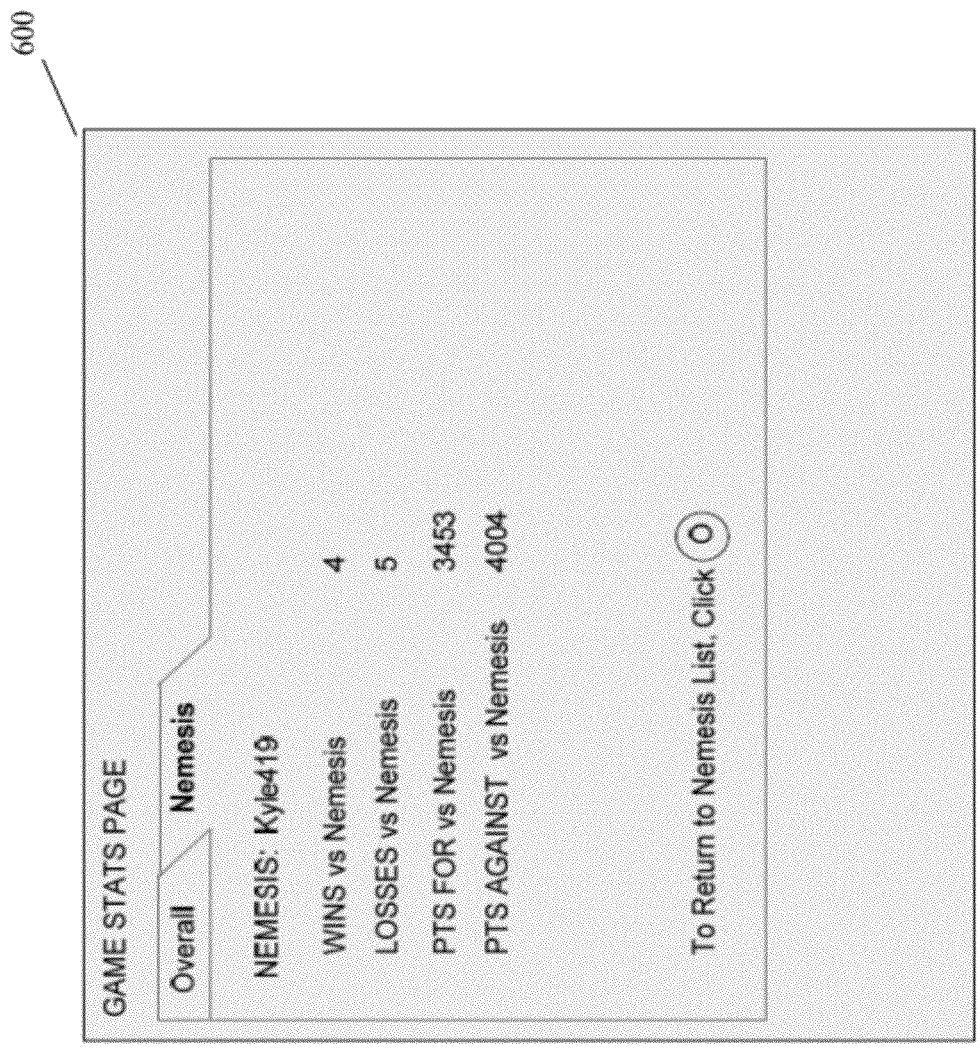
FIG. 6 is an exemplary embodiment of an exemplary specific nemesis page that may be displayed to the user/player, according to several embodiments of the present invention.

FIG. 6 illustrates an exemplary embodiment of a nemesis page 600 that may be displayed to the user/player upon selecting a specific player from the nemesis list. As shown, the player's statistics against the selected nemesis are displayed. In this exemplary embodiment, the statistics comprise the wins, losses, points for and points against the selected nemesis. However, it should be understood that other statistical data may be generated by the system and included in the display page. Furthermore, other information regarding the selected player/nemesis may also be displayed in the detailed display page 600. For example, in one embodiment information such as leader board rank and/or clan positions may also be displayed to the user when the user selects to view details of a player within the nemesis list.

Figure 7:
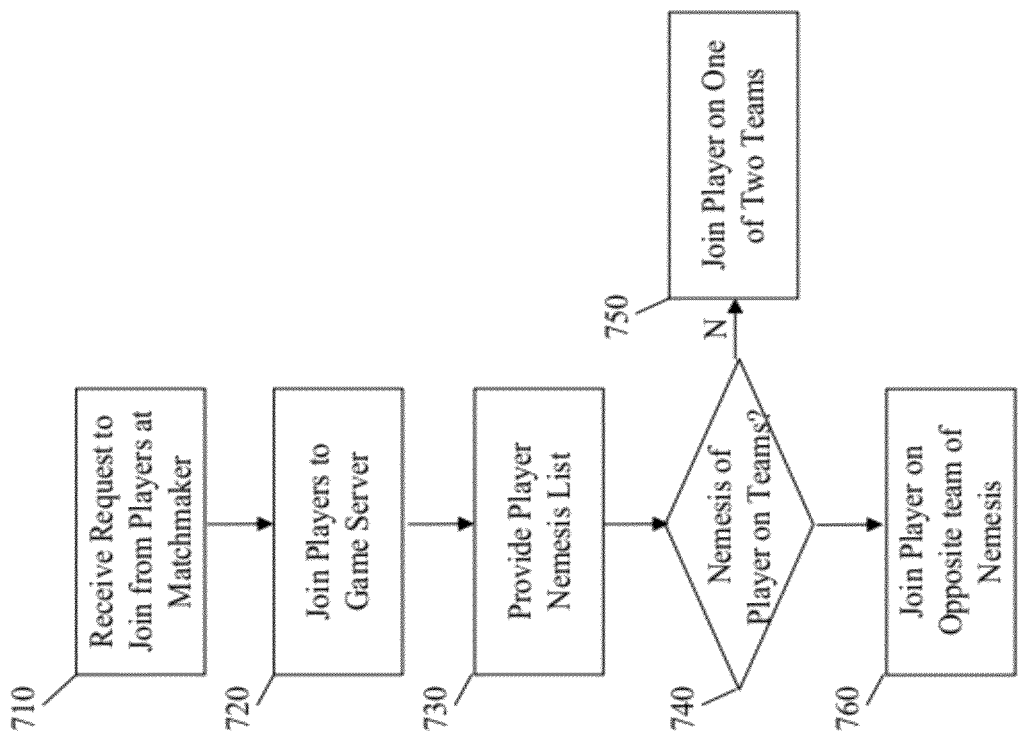
FIG. 7 is a flow diagram illustrating an alternate method of nemesis matchmaking, according to several embodiments of the present invention.

Referring next to FIG. 7, a flow diagram of an alternate method of nemesis matchmaking according to one embodiment of the present invention is illustrated. In step 710, requests to join a game are received from one or more players at a game server and/or at a regular matchmaking service. In one embodiment, the regular matchmaking service is not configured with nemesis matchmaking capability. In such embodiment, the nemesis list is provided to the game server upon connection or via server storage, rather than via the matchmaking service. In one or more embodiments, the game server is configured with the nemesis matchmaking capability.

In one embodiment, users will request to join a game as a group or will join as an individual. In one embodiment, one or more users in each group and/or one or more individual users requesting to join the game may have a nemesis list of users which they wish to play against.

In one embodiment, during step 710, players first find games via regular matchmaking using the regular matchmaking service before being connected to the game server where nemesis matchmaking occurs. For example, in one embodiment, a matchmaking service may be provided for matching players existing matchmaking criteria such as user preferences, game criteria, friends lists, etc. In one or more such matchmaking services, players are put into teams based on players they wish to play with rather than by nemesis matchmaking.

Figure 8:
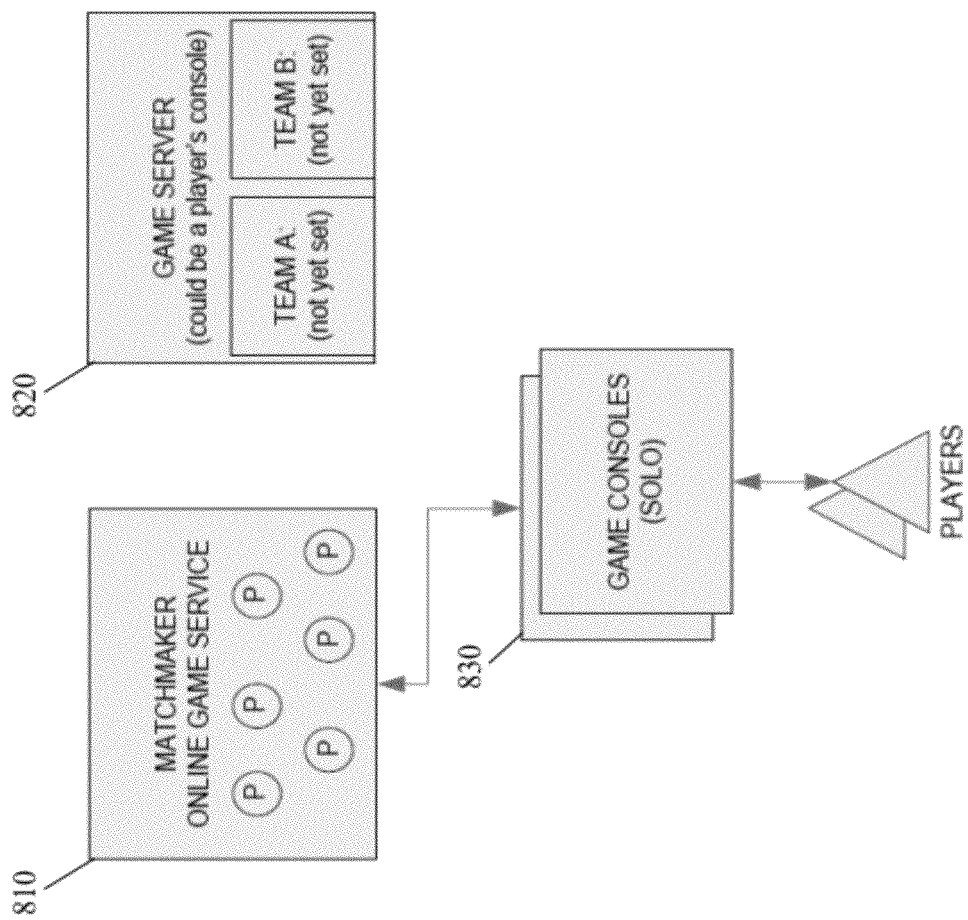
FIG. 8 is a system diagram of an exemplary embodiment of the present invention, according to several embodiments of the present invention.

FIG. 8 illustrates a system diagram of an exemplary embodiment of the present invention during step 710 described above. As shown in FIG. 8, one or more game consoles 830, i.e., player's consoles which contact the matchmaking service as a group, and/or as individuals establish a connection to the matchmaker online gaming service 810. As discussed above, players may directly communicate with the matchmaking service or may be rerouted to the matchmaking service 830 upon requesting to join a game from a different entity. As shown, at this stage, the game server 820 is not in communication with the players and all communication regarding requests for game play are processed at the matchmaking service 810.

Next, in step 720, players are joined to the game server and in step 730 the game server obtains the nemesis list for each player. In one embodiment, the list is maintained locally at each player's console. In one embodiment, step 710 may not be performed, and instead the player will directly be joined to the game server upon requesting to join a game and the game server will perform the steps for assigning the player to a team. In one embodiment the players provide their nemesis lists as they connect. In other embodiments, server storage can maintain the lists and the game server retrieves nemesis lists for each user via server storage as the player connects to the game server.

In one embodiment, the nemesis list for each player may be associated with a list of players which have been established as the player's nemesis. In one embodiment, the list may comprise a user generated list, a system generated list, or a combination thereof. In one embodiment, during game play players may use techniques such as grudge tagging to add players to their nemesis list. In one embodiment, players are able to add other players they view as nemesis to the list, and/or may enable automatic system based additions to the nemesis list. For example, in one embodiment, a player may enable the system to automatically select and add players the system determines as rivals of the players to the nemesis list.

In several embodiments, the system may allow the user to add one or more other user to his or her nemesis list. For example, in one embodiment, a user may use a method such as grudge tagging to add players he considers as rivals to his nemesis lists. In another embodiment, a user may be able to select one or more players from his friends list to be added to the nemesis list. In one embodiment, in addition, the user may request a certain result and the system may retrieve a list of players to match against the player to achieve such result. For example, if a user requests to play against top leader board players, the system may automatically determine such players and match these players against the player for game play.

In another exemplary embodiment, the player may request to play against other clan members to establish ranks in a clan, and this may also be achieved through nemesis matchmaking In one or more embodiments, such selections or additions may be done either before, during or after game play.

In other embodiments the system may automatically add users to the player's nemesis list based on different factors. In some embodiments, these factors may be specified by a user, the system and/or the game developers. For example, in one embodiment, such automatic selections may be made based on game statistics collected throughout game play such as player's game performance against other players, e.g. wins, loses, points for, points against, etc., and or other game related data such as the player's overall opinion of the other players, e.g. through comments or tags, etc.

As each player is joined to the game server, in step 740 the game server determines if other connected players are a nemesis i.e. are one of the players in the newly joined player's nemesis list. If it is determined that the incoming player does not have any nemesis in either team, or it is determined that the player does not have a nemesis list then the process moves to step 750 and the player is joined to either side or team. In one embodiment, in step 750 the player is assigned to a team such that team balance between the opposing side is achieved.

In one embodiment, in step 740, when determining team assignments, in addition to the incoming player's nemesis list, the nemesis lists for other players already within the game may also be considered to determine whether the incoming player is within any of the existing player's nemesis lists. In one embodiment, each player is assigned to a team as they are joined to the game while in other embodiments the game server may wait until all players have joined such that the teams will be filled.

On the other hand, if in step 740 it is determined that other connected players are a nemesis of the incoming player, the incoming player is matched on a side or team such that more players are opposing, i.e. on the opposite team, than cooperating with the incoming player.

FIG. 8 illustrates a system diagram of a first exemplary embodiment of the present invention during the steps 720-760 described above. As shown, once the matchmaking service 810 has received requests from players to join the game and optionally assigned to teams via regular matchmaking, the players are joined to the game server. In this embodiment, players communicate their nemesis list as they join the game server. As shown, for example, game consoles 830 are connected to game server 820 and are assigned to teams based on their nemesis list at the game server.

Figure 9:
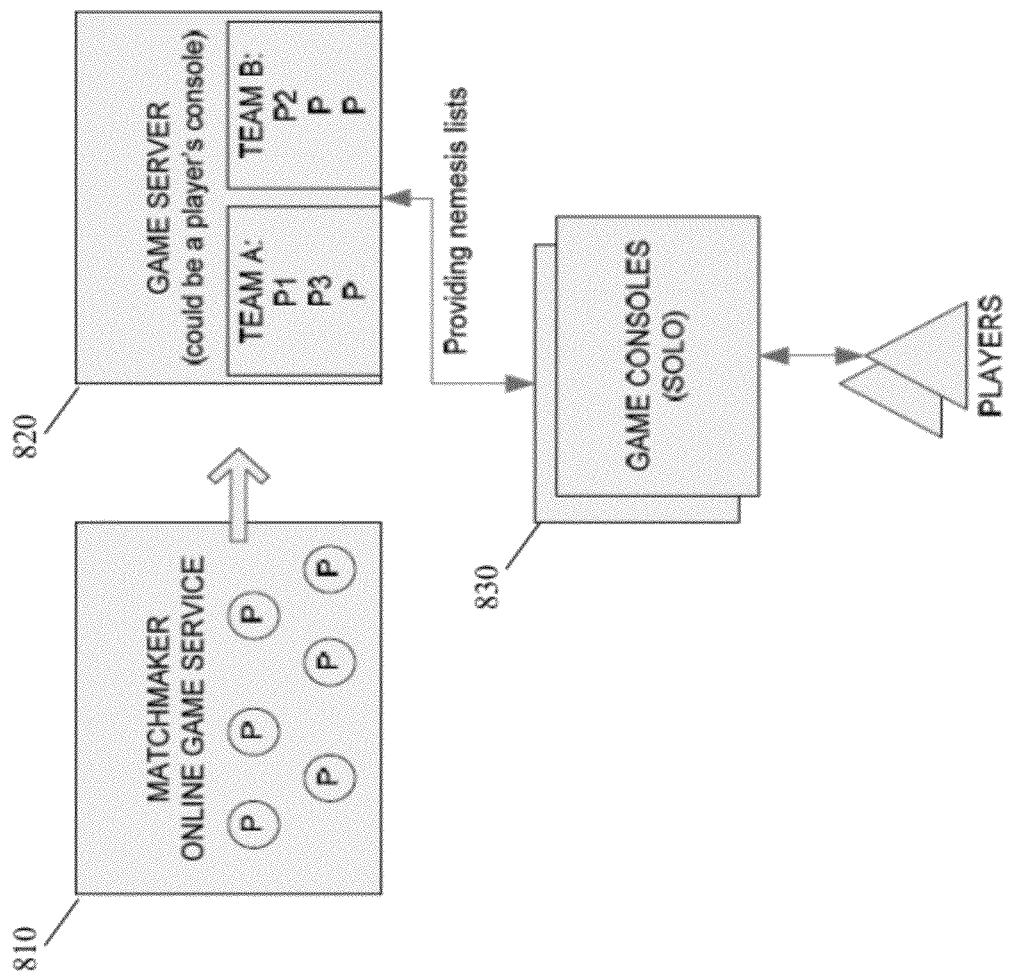
FIG. 9 is a system diagram of an exemplary embodiment of the present invention, according to several embodiments of the present invention.

FIG. 9 illustrates a system diagram of an alternate exemplary embodiment of the present invention during the steps 720-760 described above. As shown, once the matchmaking service 810 has received requests from players to join the game and optionally assigned to teams via regular matchmaking, the players are joined to the game server. In this embodiment, the game server 820 obtains each incoming player's nemesis list via server storage 840 in communication with the game server. Accordingly, game consoles 830 are connected to game server 820 and are assigned to teams at the game server based on their nemesis list maintained at the server storage 840.

In one embodiment, such nemesis matchmaking enables competing with friends and clan mates within the same online games or competitions. In one embodiment, the nemesis matchmaking enables challenging enemies or nemeses into games. In additional or alternative embodiments, the nemesis matchmaking capability is combinable with party-based matchmaking to require placement of two groups in opposition of each other within the same game. In one or more embodiment, the nemesis matchmaking method described above enables establishing groups of players with whom a given player intends to compete against, detect when those players, i.e. nemeses, are online, and challenge those players/nemeses via nemesis matchmaking.

In one embodiment, where the game comprises clans, the above method provides an approach to determining clan officer levels based on nemesis competition between clan members, such that for example in one embodiment, better players are automatically promoted. For example, the nemesis matchmaking component of the present invention enables a user/player to be set against those with higher ranks or officer levels within a clan such that the player can challenge those players and advance within the clan ranks In another embodiment, the player may achieve leader board ranking by being matched against players with better leader board rankings similar to the clan based embodiment. In yet another embodiment, the nemesis matchmaking component allows for a nemesis filtering or block. For example, in one embodiment, the matchmaking component may prevent a player from competing against players with who the player typically struggles with, or with players the player tags as not wishing to play with.

In one embodiment, when applying nemesis matchmaking to players, the system may employ weights to determine team positioning. That is, in one embodiment, each nemesis may have a weighted nemesis score in relation to other nemeses in a players list and therefore may be given higher priority or importance when the system is applying the nemesis matchmaking method described above. In one or more embodiments, such weights may be based on different criteria such as for example statistics and/or information automatically collected by the system, and/or other indications manually entered by the user, e.g. the number of grudge tags or weights assigned by the user manually to a nemesis within the nemesis list.

In one or more embodiments, in addition to maintaining nemesis lists for players, the system may further support creating statistics for game play against nemesis including information such as, wins and losses, a player's strongest nemesis, i.e. players that the player struggles with/is defeated against most, the player's best rival, i.e. players who the player is most close with in term of different characteristics and/or wins and losses, a player's weakest nemesis, i.e. players the player defeats the most, and/or game custom statistics. In one or more embodiments, by collecting statistics of each player's game activity, the system is able to determine and maintain lists containing such information. In one embodiment, this information is stored along with the nemesis list for each user and may be used during the nemesis matchmaking process. In other embodiments, the list may be stored and maintained separate from the nemesis list. In one or more embodiments, players are able to access such information and view their nemesis list and statistics. The display pages provided to the user are similar to those illustrated in FIGS. 5 and 6 discussed above.

Figure 10:
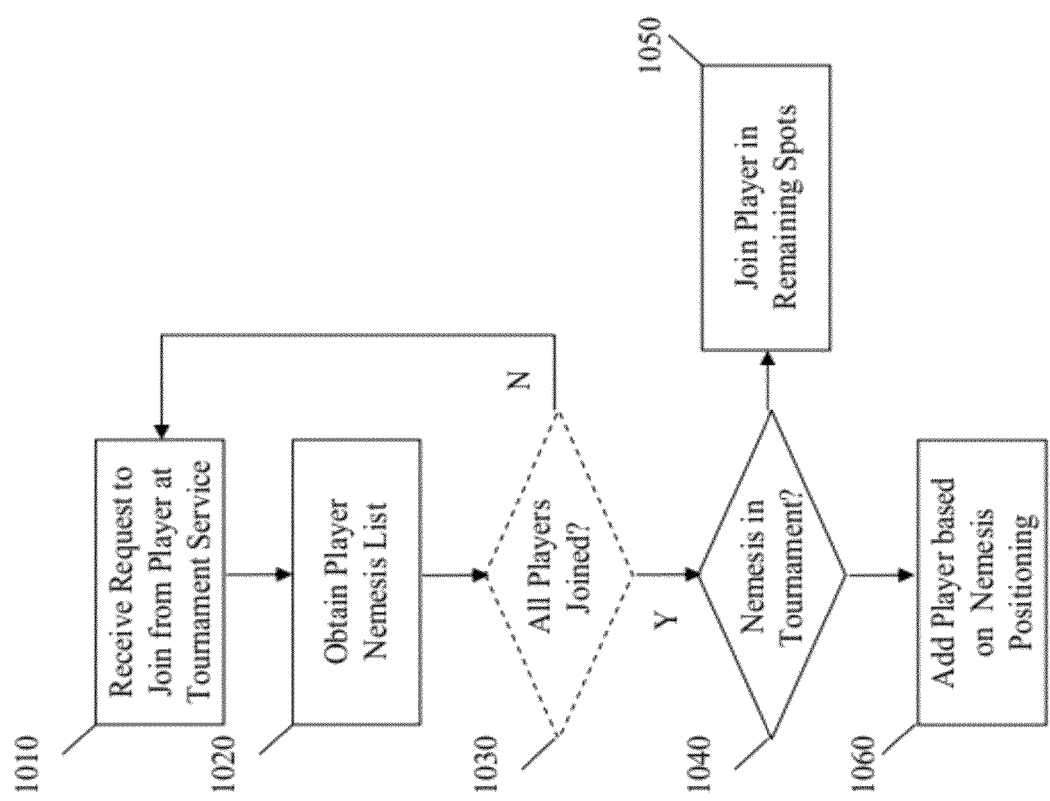
FIG. 10 is a flow diagram illustrating a method of nemesis matchmaking for tournaments, according to several embodiments of the present invention.

Referring next to FIG. 10, a flow chart of a method of nemesis matchmaking for tournament seeding is illustrated according to one embodiment of the present invention. First, in step 1010, requests to join a game are received from one or more players at a tournament service. In one embodiment, users may request to join the tournament as a group or will join as an individual. In one embodiment, one or more users in each group and/or one or more individual users requesting to join the game may have a nemesis list of users. In one embodiment, the players directly contact the tournament service. In another embodiment, players may request to join the tournament and may then be directed to the tournament service.

Next, in step 1020, the tournament service obtains the nemesis list for one or more of the players requesting to join the game. In one embodiment, each player provides the tournament service with his nemesis list. In one embodiment, the list is maintained locally at each player's console. In another embodiment, server storage can maintain the lists, and the tournament service can obtain the lists for incoming users/players from the server storage. In one embodiment, all players requesting to join the tournament may be associated with the nemesis list, while in other embodiments only a number of players have a nemesis list.

In one embodiment, the nemesis list for each player may be associated with a list of players which have been established as the player's nemesis. In one embodiment, the list may comprise a user generated list, a system generated list, or a combination thereof. In one embodiment, during game play players may use techniques such as grudge tagging to add players to their nemesis list. In one embodiment, players are able to add other players they view as nemesis to the list, and/or may enable automatic system based additions to the nemesis list. For example, in one embodiment, a player may enable the system to automatically select and add players the system determines as rivals of the players to the nemesis list.

That is, in several embodiments, the system may allow the user to add one or more other user to his or her nemesis list. For example, in one embodiment, a user may use a method such as grudge tagging to add players he considers as rivals to his nemesis lists. In another embodiment, a user may be able to select one or more players from his friends list to be added to the nemesis list. In one embodiment, in addition, the user may request a certain result and the system may retrieve a list of players to match against the player to achieve such result. For example, if a user requests to play against top leader board players, the system may automatically determine such players and match these players against the player for game play. In another exemplary embodiment, the player may request to play against other clan members to establish ranks in a clan, and this may also be achieved through nemesis matchmaking In one or more embodiments, such selections or additions may be done either before, during or after game play.

In other embodiments the system may automatically add users to the player's nemesis list based on different factors. In some embodiments, these factors may be specified by a user, the system and/or the game developers. For example, in one embodiment, such automatic selections may be made based on game statistics collected throughout game play such as player's game performance against other players, e.g. wins, loses, points for, points against, etc., and or other game related data such as the player's overall opinion of the other players, e.g. through comments or tags, etc.

Next, in step 1040, the tournament service begins the process of filling in the brackets, i.e. assigning players to the tournament. In one embodiment, the tournament service fills the tournament brackets as players sign up for the tournament. In another embodiment, the tournament service begins to fill its brackets after all signups are received. In such embodiments, an optional step 1030 may be performed to determine whether all signups have been received. For example, in one embodiment, the tournament service determines whether enough players have signed up to fill all positions within the tournament and/or whether a deadline for signing up for the tournament has been reached. If in step 230 it is determined that enough requests have not received the system returns to step 210 and waits to receive more requests and continues to step 220 and obtains the nemesis lists for those users until enough requests have been received. When it is determined, in step 1030, that all signups have been received, the service continues to step 1040.

In one or more embodiments, during step 1040 players are filled in utilizing knowledge of their nemesis list, such that nemeses are divided up as best as possible across the tournament seedings with other players filling in the remaining spots in the tournament. In one embodiment, as illustrated, during step 1040, it is determined whether a player has a nemesis or nemeses joining the tournament. In the embodiments where players are joined in as they sign up, for example, the service determines whether players who have already been signed up are nemeses of the incoming player by looking at the incoming players nemesis list and/or the nemesis lists for players who are already signed up. In embodiments, where the tournament service waits for all signups, the tournament service checks all players signed up to determined whether each player has one or more nemeses which have also signed up for the tournament.

If it is determined, that one or more players are nemeses of one another the process continues to step 1060 and the tournament service assigns the players to the tournament brackets to achieve optimal tournament seedings. In one embodiment, for example, the system assigns nemesis to games such that they do not face off until later in the tournament. In another embodiment, players may be placed against their nemesis early on in the tournament. If one the other hand, players have no nemeses in the tournament, in step 1050, the tournament service assigns the players to remaining spots to assure a balanced tournament.

In one embodiment, applying nemesis matchmaking signups are done such that better players are automatically seeded away from each other to increase probability of head to head later in the tournament. In another embodiment, the tournament placement is done to avoid matching players together who simply want a greater chance of facing each other in later rounds by emphasizing opposite groupings of these players in the initial rounds. In one embodiment, the tournament placements is done through the use of weights. In some embodiments, placement is additionally or alternatively based on rank or statistics of players to ensure that the players are prevented from competing against nemesis until later rounds and/or to enable the players to more easily advance to later stages in the tournament.

Figure 11:
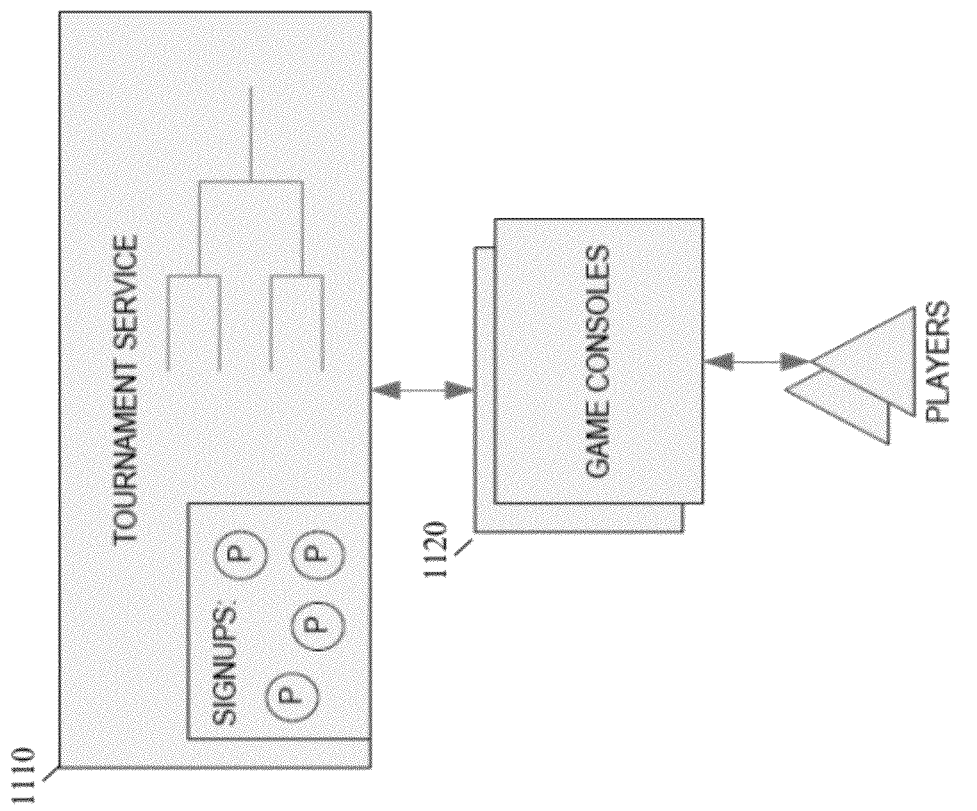
FIG. 11 is a system diagram of an exemplary embodiment of the present invention, according to several embodiments of the present invention.
Figure 12:
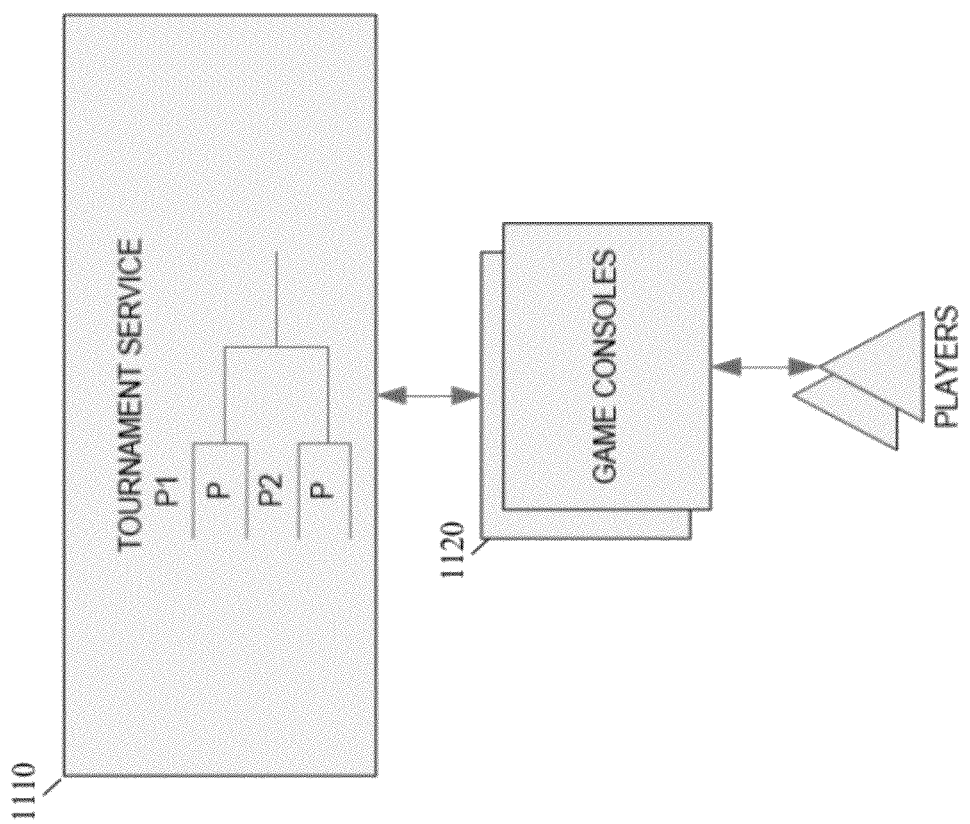
FIG. 12 is a system diagram of an exemplary embodiment of the present invention, according to several embodiments of the present invention.

FIGS. 11 and 12 illustrate an exemplary system diagram of one embodiment of the present invention during the steps 1010-1060 described above. As shown in FIG. 11, one or more game consoles 1120, i.e., player's consoles which contact the matchmaking service as a group and/or as individuals establish a connection to the tournament service 1110. As discussed above, players may directly communicate with the tournament service 1110 or may be rerouted to the tournament service 1110 upon requesting to join a game from a different entity. In yet another embodiment, the tournament service may be integrated with the game server. As shown in FIG. 11, players are assigned to teams at the tournament service based on the player's nemesis list.

In one embodiment, other considerations may further be taken into account such as the player's friend list or preferred list. That is, in addition to a nemesis list, players may further be associated with a preferred list of players which the players wish to play in the same side or team with. In such embodiment, such preferred list may also be taken into account when the tournament service assigns players to the tournament. Once the players are assigned to the teams the tournament begins and players are able to play against one another. In one embodiment, the tournament service is integrated with the game server, while in other embodiments, the tournament service may connect to the game server and communicate the team assignments to the game server and the tournament may begin upon this communication on the game server.

In one embodiment, when applying nemesis matchmaking to players, the system may employ weights to determine team positioning. That is, in one embodiment, each nemesis may have a weighted nemesis score in relation to other nemeses in a players list and therefore may be given higher priority or importance when the system is applying the nemesis matchmaking method described above. In one or more embodiments, such weights may be based on different criteria such as for example statistics and/or information automatically collected by the system, and/or other indications manually entered by the user, e.g. the number of grudge tags or weights assigned by the user manually to a nemesis within the nemesis list.

In one or more embodiments, in addition to maintaining nemesis lists for players, the system may further support creating statistics for game play against nemesis including information such as, wins and losses, a player's strongest nemesis, i.e. players that the player struggles with/is defeated against most, the player's best rival, i.e. players who the player is most close with in term of different characteristics and/or wins and losses, a player's weakest nemesis, i.e. players the player defeats the most, and/or game custom statistics. In one or more embodiments, by collecting statistics of each player's game activity, the system is able to determine and maintain lists containing such information. In one embodiment, this information is stored along with the nemesis list for each user and may be used during the nemesis matchmaking process. In other embodiments, the list may be stored and maintained separate from the nemesis list. In one or more embodiments, players are able to access such information and view their nemesis list and statistics. The display pages provided to the user are similar to those illustrated in FIGS. 5 and 6 discussed above.

Figure 13:
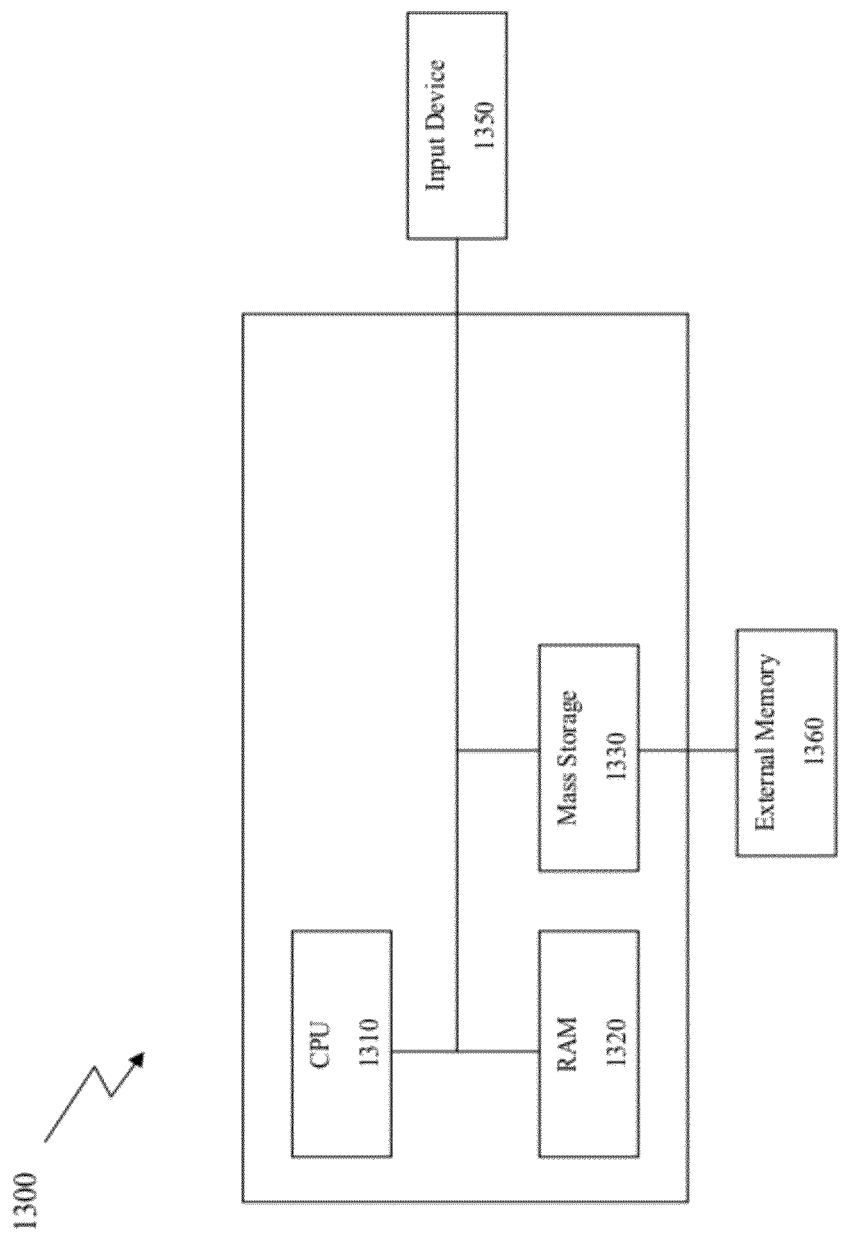
FIG. 13 illustrates a system that may be used for implementing one or more methods according to several embodiments of the present invention.

The methods and techniques described herein may be utilized, implemented and/or run on many different types of systems, including for example computers, game consoles, entertainment systems, etc. Referring to FIG. 13, there is illustrated a system 1300 that may be used for any such implementations. One or more components of the system 1300 may be used for implementing any system or device mentioned above, such as for example the game consoles, set top boxes, entertainment systems, game server, matchmaker service and/or tournament service. However, the use of the system 1300 or any portion thereof is certainly not required. For example, in one embodiment, a game console may be implemented having one or more elements of the system 1300. In another embodiment, a game console, set top box or other entertainment console may be implemented using some of the elements of the system 1300.

By way of example, the system 1300 may include, but is not required to include, a central processing unit (CPU) 1310, a random access memory (RAM) 1320, and a mass storage unit 1330, such as a disk drive. The system 1300 may be coupled to, or integrated with, any of the other components described herein, such as an input device 1350. The system 1300 comprises an example of a processor based system. The CPU 1310 may be used to execute or assist in executing the steps of the methods and techniques described herein. In one embodiment, the system 1300 may further comprise a GPU to execute or assist in executing the steps of the methods and techniques described herein.

In some embodiments, the input device 1340 may comprise a controller such as a handheld controller, keyboard, remote, mouse, joystick, etc. In another embodiment, other input device 1340 may further comprise output means, such as stereo, displays, light emitters, etc. In one embodiment one or more of the input device 1340 may comprise display functionality. In one embodiment various program content, images, shadows, lighting, etc. may be rendered on one or more of the input device 1340.

The mass storage unit 1330 may include or comprise any type of computer readable storage or recording medium or media. The computer readable storage or recording medium or media may be fixed in the mass storage unit 1330, or the mass storage unit 1330 may optionally include external memory 1360, such as a digital video disk (DVD), Blu-ray disc, compact disk (CD), USB storage device, floppy disk, or other media. By way of example, the mass storage unit 1330 may comprise a disk drive, a hard disk drive, flash memory device, USB storage device, Blu-ray disc drive, DVD drive, CD drive, floppy disk drive, etc. The mass storage unit 1330 or external memory 1360 may be used for storing program code or macros that implement the methods and techniques described herein.

Thus, external memory 1360 may optionally be used with the mass storage unit 1330, which may be used for storing program code that implements the methods and techniques described herein. However, any of the storage devices, such as the RAM 1320, mass storage unit 1330 or external memory 1360, either alone or in combination may be used for storing such program code. For example, any of such storage devices may serve as a tangible computer readable storage medium for storing or embodying a computer program for causing a console, system, computer, or other processor based system to execute or perform the steps of any of the methods, code, and/or techniques described herein. Furthermore, any of the storage devices, such as the RAM 1320, mass storage unit 1330 or external memory 1360, may be used for storing any needed database(s), lists, etc.

In some embodiments, a processor-based apparatus may be used for executing or performing any of the above-described steps, methods, and/or techniques. Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein.

For example, in some embodiments the present invention provides a computer readable storage medium storing one or more computer programs adapted to cause a processor based system to execute steps comprising receiving a request from a user to join a game having one or more matches, wherein the matches comprise a first side playing against a second side wherein each of the first side and second side comprises a set of one or more players, retrieving a nemesis list for the user wherein the nemesis list comprises a list of one or more players having a determined rivalry against the user and assigning the user to at least one match on one of the first side and the second side at least in part based on the nemesis list.

Many of the functional units described in this specification may be implemented by hardware and/or software means. For example, one or more functional units may be implemented as a hardware circuit comprising custom VLSI circuits or gate arrays, off-the-shelf semiconductors such as logic chips, transistors, or other discrete components. In some embodiments, one or more functional units may also be implemented in programmable hardware devices such as field programmable gate arrays, programmable array logic, programmable logic devices or the like.

In additional, one or more functional components may also be implemented in software for execution by various types of processors. An identified unit implemented in part or whole in executable code may, for instance, comprise one or more physical or logical blocks of computer instructions that may, for instance, be organized as an object, procedure, or function. Nevertheless, the executables of an identified unit need not be physically located together, but may comprise disparate instructions stored in different locations which, when joined logically together, comprise the functional unit and achieve the stated functions described throughout the above embodiments.

Indeed, a module one or more functional units implemented at least in part by executable code could be a single instruction, or many instructions, and may even be distributed over several different code segments, among different programs, and across several memory devices. Similarly, operational data may be identified and illustrated herein within a unit, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the above description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

While the invention herein disclosed has been described by means of specific embodiments, examples and applications thereof, numerous modifications and variations could be made thereto by those skilled in the art without departing from the scope of the invention set forth in the claims.

What is claimed is:

1. A non-transitory computer readable storage medium storing one or more computer readable programs adapted to cause a processor based system to execute steps comprising:
   receiving a request from a user to join a game having one or more matches, wherein the matches comprise a first side playing against a second side wherein each of the first side and second side comprises a set of one or more players;
   obtaining a nemesis list for the user wherein the nemesis list comprises a list of one or more players having a determined rivalry against the user;
   assigning the user to at least one match on one of the first side and the second side at least in part based on the nemesis list; and
   automatically determining clan officer levels of multiple of the one or more players within a clan based on the nemesis list and nemesis competition.

2. The computer readable storage medium of claim 1, wherein assigning the user to at least one match on one of the first side and the second side comprises assigning the user to a match on one of the first side and the second side wherein the user has the highest probability to play against players on the nemesis list.

3. The computer readable storage medium of claim 1, wherein the nemesis list comprises a list of players selected by the user.

4. The computer readable storage medium of claim 1, wherein the nemesis list comprises a list of players automatically selected based on one or more of the user's past played games and matches.

5. The computer readable storage medium of claim 1, further comprising retrieving a player profile corresponding to the user, the player profile comprising the nemesis list for the user.

6. The computer readable storage medium of claim 1, wherein at the time of the request one or more players are assigned to one or both of the two opposing teams, and wherein assigning the player to one of the two opposing teams comprises determining how many players from the user's nemesis list are playing on each team and assigning the user to the team having the lower number of players from the user's nemesis list.

7. The computer readable storage medium of claim 1, wherein the automatically determining the clan officer levels comprises defining clan rankings based on results of members within the clan competing against one or more non-clan members having rankings better than those of other clan members.

8. The computer readable storage medium of claim 1, wherein the nemesis list comprises a set of players each having a score, and wherein the assigning the user to one or more matches on one of the first side and second side comprises assigning the user to a side for each of the one or more matches which provides the user with the highest probability to play against one or more users on the nemesis list having the highest score on the nemesis list.

9. The computer readable storage medium of claim 1, wherein assigning the user to one or more matches on one of the first side and second side comprises assigning the user to a side for each of the one or more matches such that the player avoids playing against one or more users on the nemesis list.

10. The computer readable storage medium of claim 1, wherein the game comprises a tournament having two or more matches and assigning the user to the two or more matches according to the nemesis list.

11. The computer readable storage medium of claim 1, wherein obtaining the nemesis list comprises receiving the nemesis list for each user as the user requests to join the game.

12. The computer readable storage medium of claim 1, wherein obtaining the nemesis list comprises contacting a remote storage storing the nemesis list and obtaining the nemesis list for each user from the remote storage.

13. A processor-based system comprising:
   one or more processor-based machines;
   the processor-based system configured to perform steps comprising:
   receiving a request from a user to join a game having one or more matches, wherein the matches comprise a first side playing against a second side wherein each of the first side and second side comprises a set of one or more players;

obtaining a nemesis list for the user wherein the nemesis list comprises a list of one or more players having a determined rivalry against the user;

assigning the user to at least one match on one of the first side and the second side at least in part based on the nemesis list; and automatically determining clan officer levels of multiple of the one or more players within a clan based on the nemesis list and nemesis competition.

14. The system of claim 13, wherein assigning the user to at least one match on one of the first side and the second side comprises assigning the user to a match on one of the first side and the second side wherein the user has the highest probability to play against players on the nemesis list.

15. The system of claim 13, wherein
the automatically determining the clan officer levels comprises defining clan rankings based on results of members within the clan competing against one or more non-clan members having rankings better than those of other clan members, and automatically promoting one or more members within the clan based on nemesis competition.

16. The system of claim 13, wherein the nemesis list comprises a list of players automatically selected based on one or more of the user's past played games and matches.

17. The system of claim 13, further comprising retrieving a player profile corresponding to the user, the player profile comprising the nemesis list for the user.

18. The system of claim 13, wherein at the time of the request one or more players are assigned to one or both of the two opposing teams, and wherein assigning the player to one of the two opposing teams comprises determining how many players from the user's nemesis list are playing on each team and assigning the user to the team having the lower number of players from the user's nemesis list.

19. The system of claim 13, wherein the player profile further comprises a preference list for players to play with, and wherein the assigning the user to the team is further based on the preference list.

20. The system of claim 13, wherein the nemesis list comprises a set of players each having a score, and wherein the assigning the user to one or more matches on one of the first side and second side comprises assigning the user to a side for each of the one or more matches which provides the user with the highest probability to play against one or more users on the nemesis list having the highest score on the nemesis list.

21. The system of claim 13, wherein assigning the user to one or more matches on one of the first side and second side comprises assigning the user to a side for each of the one or more matches such that the player avoids playing against one or more users on the nemesis list.

22. The system of claim 13, wherein the game comprises a tournament having two or more matches and assigning the user to the two or more matches according to the nemesis list.

23. The system of claim 13, wherein obtaining the nemesis list comprises receiving the nemesis list for each user as the user requests to join the game.

24. The system of claim 13, wherein obtaining the nemesis list comprises contacting a remote storage storing the nemesis list and obtaining the nemesis list for each user from the remote storage.

25. A method comprising:
receiving at a processor based system a request from a user to join a game having one or more matches, wherein the matches comprise a first side playing against a second side wherein each of the first side and second side comprises a set of one or more players;

obtaining a nemesis list for the user wherein the nemesis list comprises a list of one or more players having a determined rivalry against the user;

assigning, by the processor based system, the user to at least one match on one of the first side and the second side at least in part based on the nemesis list; and automatically determining clan officer levels of multiple of the one or more players within a clan based on the nemesis list and nemesis competition.

26. A non-transitory computer readable storage medium storing one or more computer readable programs adapted to cause a processor based system to execute steps comprising:
receiving a request from a user to achieve an objective in a game having one or more matches, wherein the matches comprise a first side playing against a second side, and wherein each of the first side and second side comprises a set of one or more players, wherein the objective is achieved by the user playing against one or more other players;

obtaining a list of the one or more other players necessary for achieving the objective;

assigning the user to at least one match on one of the first side and the second part such that the user is able to play against the one or more other players necessary for achieving the objective; and automatically determining officer levels of multiple of the one or more players within a clan based on the nemesis list and nemesis competition.

27. The method of claim 26, wherein obtaining the list comprises automatically determining players that must be paired with the user to achieve the objective.

* * * * *